US012684279B2

(12) United States Patent
Anderson et al.

(10) Patent No.: US 12,684,279 B2
(45) Date of Patent: Jul. 14, 2026

(54) BIDIRECTIONAL MULTI-CHANNEL AUDIO LINK FOR TRANSDUCERS

(71) Applicant: Sound Devices LLC, Reedsburg, WI (US)

(72) Inventors: Matthew G. Anderson, Madison, WI (US); Francois Morin, Chambly (CA)

(73) Assignee: Sound Devices, LLC, Reedsburg, WI (US)

( * ) Notice: Subject to any disclaimer, the term of this patent is extended or adjusted under 35 U.S.C. 154(b) by 134 days.

(21) Appl. No.: 18/900,687

(22) Filed: Sep. 28, 2024

(65) Prior Publication Data

US 2025/0113134 A1 Apr. 3, 2025

Related U.S. Application Data

(60) Provisional application No. 63/586,589, filed on Sep. 29, 2023.

(51) Int. Cl.
*H04R 1/10* (2026.01)

(52) U.S. Cl.
CPC ......... *H04R 1/1033* (2013.01); *H04R 1/1016* (2013.01)

(58) Field of Classification Search
CPC ...... H04R 1/1033; H04R 5/04; H04R 1/1016; H04R 1/1041; H04R 5/02; H04R 5/033; H04R 2420/03; H04R 2420/05; H04R 2420/07; H04R 2420/09; H04R 2499/13
USPC .......................................................... 381/74
See application file for complete search history.

(56) References Cited

U.S. PATENT DOCUMENTS

| | | | | |
|---|---|---|---|---|
| 8,391,535 | B1 | 3/2013 | Harvey | |
| 9,949,048 | B2 | 4/2018 | Isberg | |
| 9,986,353 | B2 | 5/2018 | Puskarich | |
| 10,560,792 | B2 | 2/2020 | Lin | |
| 10,667,067 | B2 | 5/2020 | Goldstein | |
| 2006/0126862 | A1 * | 6/2006 | Andrews .................. | H04R 5/02 381/77 |

(Continued)

FOREIGN PATENT DOCUMENTS

| | | | |
|---|---|---|---|
| CN | 210112260 | U | 2/2020 |
| WO | 9909787 | A1 | 2/1999 |

(Continued)

OTHER PUBLICATIONS

PCT/US2024/049146, International Search Report and Written Opinion dated Jan. 16, 2025, 17 pages.

(Continued)

*Primary Examiner* — Paul Kim
(74) *Attorney, Agent, or Firm* — Andrus Intellectual Property Law, LLP

(57) ABSTRACT

An audio transducer system, such as in-ear monitors, are connected to an audio base unit, such as a receiver body pack, using a bidirectional serial time-division multiplexed link. The bidirectional connecting cable has a single active conductor and a ground wire, a detachable connector to the receiver body pack and, preferably, a detachable connector to the sin-ear monitors. The invention provides for bidirectional communication between the audio base unit (receiver body pack) and the audio transducer system (in-ear monitors) and enables simultaneous and automatically configured DC power supply depending on the identified requirements.

19 Claims, 6 Drawing Sheets

(56) References Cited

U.S. PATENT DOCUMENTS

2011/0293112 A1 12/2011 Harvey

FOREIGN PATENT DOCUMENTS

| | | | |
|---|---|---|---|
| WO | 2010115451 | A1 | 10/2010 |
| WO | 2023059214 | A1 | 4/2023 |

OTHER PUBLICATIONS

Rocchi Nicolas et al., "A Modular, Low Latency, A2B-based Architecture for Distributed Multichannel Full-Digital Audio Systems", 2021 Immersive and 3D Audio: From Architecture to Automotive (13DA), IEEE, Sep. 8, 2021, pp. 1-8, XP034028632; retrieved Nov. 9, 2021.

Kessler, Martin, "Introducing the Automotive Audio Bus (A 2 B)", AES Conference on Automotive Audio, Sep. 1, 2017, XP055853748, Retrieved from the Internet: https://www.aes.org/tempFiles/elib/20211021/19187.pdf; Retrieved Oct. 21, 2021.

PCT/US2024/049146, International Preliminary Report on Patentability dated Apr. 9, 2026, 10 pages.

* cited by examiner

BIDIRECTIONAL MULTI-CHANNEL AUDIO LINK FOR TRANSDUCERS

CROSS-REFERENCE TO RELATED APPLICATION

The present application claims priority of U.S. Provisional Patent Application No. 63/586,589, filed Sep. 29, 2023, the content of which is incorporated herein by reference in its entirety.

FIELD OF THE INVENTION

The invention provides means to improve the flexibility and usability of a variety of audio devices that are intended to produce multi-channel physical audio waveforms based upon audio data, device data and power transmitted from an audio base unit, such as a receiver body pack, to an audio transducer system, such as in-ear monitors with digital processing units. This invention transmits digital data bidirectionally to and from the audio base unit as time-division multiplexed serial data words over a connecting cable having a single active line. An arbitrary number of channels of audio, sensor data and control data can be transmitted over the active line.

BACKGROUND

Professional stage in-ear monitor systems are known to use wireless technology to send an audio mix to the in-ear monitors. The systems transmit audio data from a control console via an RF transmitter (e.g., off stage) to an RF receiver in a receiver body pack worn by the performer. Any number of receivers can receive a single audio mix. The transmitters and receivers transfer audio wirelessly via a radio frequency (e.g., tunable in VHF and UHF). The in-ear monitor cable typically plugs into a 3.5 mm stereo jack on the receiver body pack, which is often clipped onto the belt, guitar strap, clothing of the performer, or placed in a pocket. The receiver body pack outputs analog audio signals to the in-ear monitors which are the last stage of the signal path in the system. The in-ear monitors are placed in the external ear canal and seal against the sides of the ear canal.

Universal in-ear monitors include a variety of foam and silicone tips. If a universal earpiece does not fit a specific person, they may need to order custom in-ear monitors. Custom molded in-ear monitors are more comfortable to wear and better isolate the audio from ambient noise but can be quite expensive. Depending on the quality of the fit and length of the canal portion of the earpiece, a custom fit in-ear monitor will generally provide somewhere between 25 and 34 dB of noise reduction. This means that loud onstage instruments are less likely to cause hearing damage for onstage musicians wearing in-ear monitors. Impressions for custom in-ear monitors are often taken by an audiologist.

Some performers desire a more natural sound from their in-ear monitors. For this purpose, some in-ear monitors have a small hole drilled into the earpiece to allow natural ambient sound into the ear canal. This can potentially lead to increased sound exposure as it reduces the signal-to-noise ratio for the audio mix and causes the musician to increase the volume of the in-ear monitor. Active ambient in-ear monitors use external microphones to reproduce the ambient sound in the audio mix.

In-ear monitors, earbuds and headphones, are known to have multiple speakers, where a smaller speaker provides more effective sound reproduction at higher frequencies and a larger speaker provides more effective sound reproduction at lower frequencies. Other examples where multiple output transducers are desirable may include those where an output vibration transducer (or bone conduction transducer) is used, or even cases where multiple sources are to be listened to. An example prior-art application of this technique is presented by U.S. Pat. No. 8,311,259 where an in-ear monitor (or earbud) is configured to fit within a user's auditory canal and contains multiple "balanced armature" or "BA transducers" connected to the output of a "frequency divider" network (labelled as item 107 in FIGS. 1 through 4 of this reference). Some challenges posed by this approach include the need to house a frequency divider network, which, if implemented in hardware, may be difficult (or impossible) to reconfigure based on the customized preferences of a user while in operation. As an alternative, a digital frequency divider network may be designed where software is used in place of a hardware implementation. However, this approach requires digital signal processing resources that would necessarily come at the expense of other functions or features that would benefit by having these resources being dedicated to them. In some cases, power consumption and/or heat dissipation arising from digital processing may also become a concern.

A primary object of the invention is to provide an effective way of transmitting data between an audio base unit (e.g. a receiver body pack) and an audio transducer system (e.g. digital in-ear monitors) to facilitate the transmission demands of multi-channel audio data, control data as well as the capability of transmitting control data and possibly sensor data from the audio transducer system (e.g., digital in-ear monitors) to the audio base unit (e.g. receiver body pack). For example, it is also known to place a microphone in an earpiece to detect sound levels in the ear canal, see U.S. Pat. No. 10,667,067 B2, entitled "Earguard Monitoring System" by Steven Wayne Goldstein., issuing May 26, 2020. The microphone data is used to determine sound levels which in turn are used to limit dangerous volume levels. The invention is able to address the data transmission needs of such a system effectively. Facilitating effective bidirectional data flow enables better allocation of processing resources on the audio base unit (e.g., receiver body pack) and the audio transducer system (e.g., in-ear monitors) as well as on other devices communicating with the audio base unit, such as a control console.

Another object of the invention is to provide DC power to the audio transducer system (e.g. in-ear monitors) from the audio base unit (e.g. receiver body pack), in a reliable, simple manner.

SUMMARY OF THE INVENTION

The present invention uses a physical cable, namely a bidirectional link having a single active line to address the data transmission needs associated with multi-channel audio and the bidirectional flow of non-audio data such as control data and possibly sensor data. Optionally, the bidirectional link is also capable of DC power transmission. The receiver audio body pack, or other audio base unit, and in-ear monitors, or other audio output transducer device, are configured to implement bidirectional, time-division multiplexed serial data transmission over the active line of the bidirectional link. Users need not be concerned with inadvertently connecting incompatible components via the bidirectional link as the system includes means for connected devices (e.g. in-ear monitors) to detect compatibility with the audio base unit (e.g. a receiver body pack) and its power supply before enabling use of the output audio transducer system (e.g. in-ear monitors, earbuds or headphone).

The exemplary embodiment of the invention is directed to using the bidirectional link in an in-ear audio monitoring system used by musicians and other performers. There are three basic elements to the in-ear audio monitoring system. The first element is a rack-mounted RF transmitter (or RF transceiver) with a display and screens, e.g. a control console operated by a sound engineer. The second element is a belt-worn, receiver body pack with an RF receiver (or RF transceiver) that communicates via tuned UHF or VHF with the control console. The third element is the earpieces or in-ear monitors, e.g. right side and left side in-ear monitors. In accordance with the invention, the bidirectional link connects the right side and the left side in-ear monitors to the receiver body pack. The bidirectional link is physically connected between the receiver body pack and the in-ear monitors in common. Multi-channel digital audio data and non-audio data are transmitted over the bidirectional link using time division multiplexed serial data transmission. Each in-ear monitor has a transducer digital processing unit, e.g. a microcontroller unit or an FPGA, and preferably internal non-volatile memory which is used to store user settings, factory ID and/or calibration information. The receiver body pack also has a digital processing unit, e.g. a microcontroller unit or an FPGA, and non-volatile memory. On stage, a multi-channel audio mix is typically transmitted at a selected radio frequency from the rack mounted RF transmitter to the RF receiver on the receiver body pack. Then, the multi-channel audio is converted to a serial digital data stream, along with other control data, which is transmitted over the bidirectional link to the in-ear monitors. As mentioned, the transmission of the multi-channel digital audio data, and the control data is accomplished via time division multiplexed serial data transmission. In the exemplary embodiment of the invention, each in-ear monitor also includes a microphone to monitor sound and/or sound energy level exposed to the user's ear canal. The microphone signal is converted to digital serial data in the in-ear monitor and is transmitted over the bidirectional link via bidirectional time division multiplexing as described in more detail below. Accordingly, the invention can be used to limit audio volume and/or extended exposure to audio above safe levels or provide warnings regarding audio safety limits. The microphone signal can also be used to detect voice commands, which can be interpreted by the audio base unit or control console or can be made available to the sound engineer.

The invention is not limited to using the bidirectional link to communicate only between a receiver body pack and in-ear monitors. In a more general sense, the term "audio base units" is used herein to identify devices that process, store, condition, amplify and/or transmit electrical audio signals and control data. The term "audio output transducer device" is used to identify in-ear monitors, earbuds, headphones or other audio output devices. The bidirectional connecting cable has an active line, and a ground line that connects between the audio base unit and the audio output transducer device. DC power output from the audio base unit, base device data, and digital audio data are transmitted over the active line in the bidirectional connecting cable to a processing unit on the audio output transducer device, and transducer device data from a processing unit in the audio output transducer device is also transmitted over the active line (in the other direction) to the audio base unit. In accordance with the invention, all transmitted data is digital data and is transmitted bidirectionally over the active line as time-division multiplexed serial data words.

In the exemplary embodiment, the invention is implemented in a multi-channel audio system and the audio base unit is configured to output multi-channel digital audio data, in addition to DC power and base device data. The audio base unit is preferably a receiver body pack that has a power source such as a battery. Each in-ear monitor in the audio transducer system includes a processing unit as mentioned previously, a plurality of transducer amplifiers and a plurality of acoustic output elements. The in-ear monitors are configured to receive DC power, base device data, and multi-channel digital audio data over the active line on the bidirectional connecting cable. The in-ear monitors are both connected to the active line in the exemplary embodiment. Optionally, in-ear monitors can also receive data to drive a haptic actuator, which generates vibration the user can feel, e.g. to provide the sensation of reverberation.

The audio transducer processing unit (in the in-ear monitor) includes an internal digital processor, e.g. an FPGA, that demultiplexes the multi-channel digital audio data transmitted from the audio base unit and outputs separate digital audio signals for each respective acoustic element. Multiple digital-to-analog converters each receive one of the separate digital audio signals from the internal digital processor (e.g. FPGA) and output an analog audio signal that drives the respective acoustic element.

The audio transducer processing unit is also configured to output transducer device data that is transmitted over the bidirectional connecting cable to the audio base unit. Desirably, the in-ear monitors include an input transducer such as a microphone in the acoustic output port of the earpiece. This microphone is desirably used to monitor the decibel level in the ear canal, or the voice of the user. The audio transducer processing unit has an analog-to-digital converter that receives an amplified signal from the microphone for this purpose. The audio transducer processing unit is configured to output digital transducer data, which in turn is transmitted over the active line of the bidirectional cable as time-division multiplexed serial data words.

Preferably, the bidirectional time-division multiplexed serial data words are transmitted over the active line during a synchronized sample period having a constant frequency and a start of each sample period $t_s$ and an end of each sample period $t_e$. The audio base unit emits a predetermined start synchronizing word at the start of each sample period $t_s$ on the active line of the bidirectional connecting cable that facilitates locking of a phase-locked loop in the transducer processing unit of the audio transducer system (e.g. in-ear monitor) to generate a word clock reference and emits data words of the multi-channel digital audio data, the base device data followed by a transition synchronizing word to notify the transducer processing unit to begin transmitting the transducer device data from the audio transducer processing unit over the active line to the audio base unit. The base unit transmits a final synchronizing signal at the end of the sample period (where $t=t_e$). Desirably, said data words of the multi-channel digital audio data are emitted sequentially. In the exemplary embodiment, both of the in-ear monitors communicate with the audio base unit (receiver body pack) over the active line in the bidirectional link, and address data is used to identify the proper in-ear monitor for the data. The audio base unit also signals over the active line when it is ready to receive data from the respective in-ear monitors.

Using the invention, audio transducer systems and audio base units are able to reliably exchange multi-channel data describing (distinct) audio signals and control information.

It also enables an audio base unit to provide a flexible source of DC power to the audio transducer system. The invention can be implemented with a single shielded conductor paired with a grounding conductor. Desirably, the audio transducer systems and audio base units may be connected via these simple conductors utilizing connectors that are commonly available, such as a 3.5 mm jack, ¼ inch headphone jack, BNC or RCA connector, generic plug-type connectors or even standard USB connectors. In the exemplary embodiment, the active line and ground of the bidirectional link are connected with a jack at one end to the receiver body pack and connected to each earpiece with a jack as well.

Since the jacks removably connect the bidirectional connecting cable to a port on the audio output transducer device (e.g. in-ear monitors), the audio transducer processing unit includes an ID resistor to identify that the in-ear monitors are compatible with the receiver body packs. When the bidirectional connecting cable is connected to the audio output transducer device (e.g. in-ear monitors), DC power is transmitted from the audio base unit (receiver body pack) only if it is determined that the ID resistor is compatible with audio base unit. If so, an LED light on the in-ear monitor illuminates to indicate compatibility. In many circumstances, the in-ear monitors will be In the exemplary embodiment of the invention, the in-ear monitor has an exterior housing, and a plurality of acoustic output elements including a first acoustic transducer (low frequency speaker) and a second acoustic transducer (high-frequency speaker). A flexible in-ear plug surrounds the acoustic output port and is configured to be placed in the ear canal of the user. A first acoustic chamber extends from the first speaker in the exterior housing into the acoustic output port and a second acoustic chamber extends from the second speaker in the exterior housing into the acoustic output port. This embodiment provides 2-channel audio output; however, the invention can be implemented with 3- or 4-channel audio output if desired. It may also be desired that the earpiece has a haptic actuator that generates vibration that the user can feel. The haptic actuator is driven from data transmitted from the audio base unit similar to the multi-channel audio data. The preferred in-ear monitor also has a microphone in the acoustic output port, as described above. DC bias voltage for the microphone in the acoustic output port is provided from a power supply control on the audio base unit over the bidirectional link.

In some embodiments of the invention, the audio base unit generates single channel audio, e.g., to drive one speaker in the earpiece or matching speakers in a system with two earpieces. Such systems are similar in other respects to the multi-channel speaker system described above. For example, the in-ear monitors or earpieces preferably have a microphone in the acoustic output port to monitor decibel levels in the ear canal, and the bidirectional connecting cable connects the in-ear monitor or earpiece to the audio base unit. Again, the transmitted data is digital data (optionally superimposed on DC power) and is transmitted bidirectionally over the active line as time-division multiplexed serial data words. Other features and advantages of the invention may be apparent to those skilled in the art after reviewing the drawings and the description thereof.

DETAILED DESCRIPTION OF THE EXEMPLARY EMBODIMENT OF THE INVENTION

Figure 1:
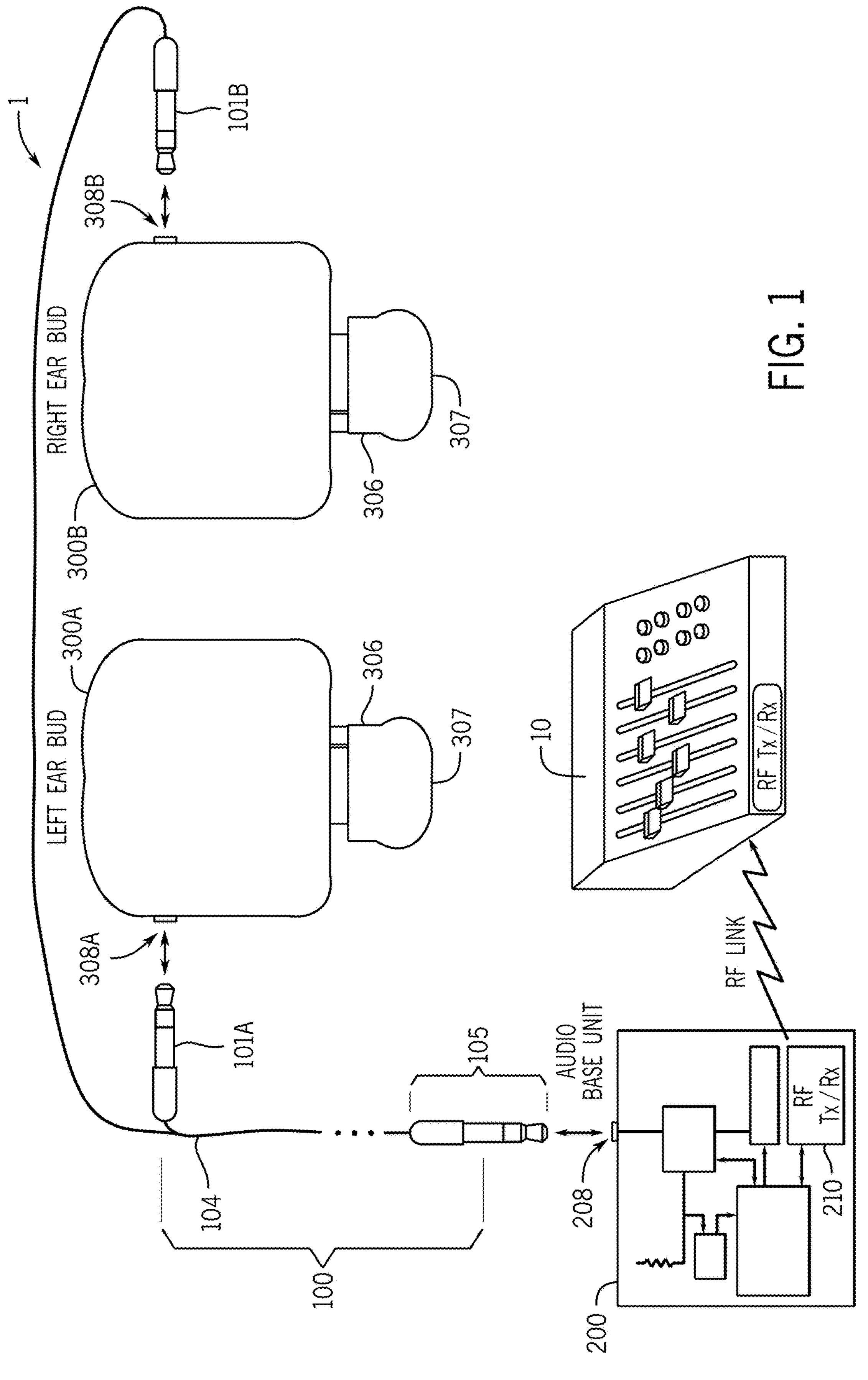
FIG. 1 shows an in-ear audio monitoring system using bidirectional links in accordance with an exemplary embodiment of the invention.
Figure 2A:
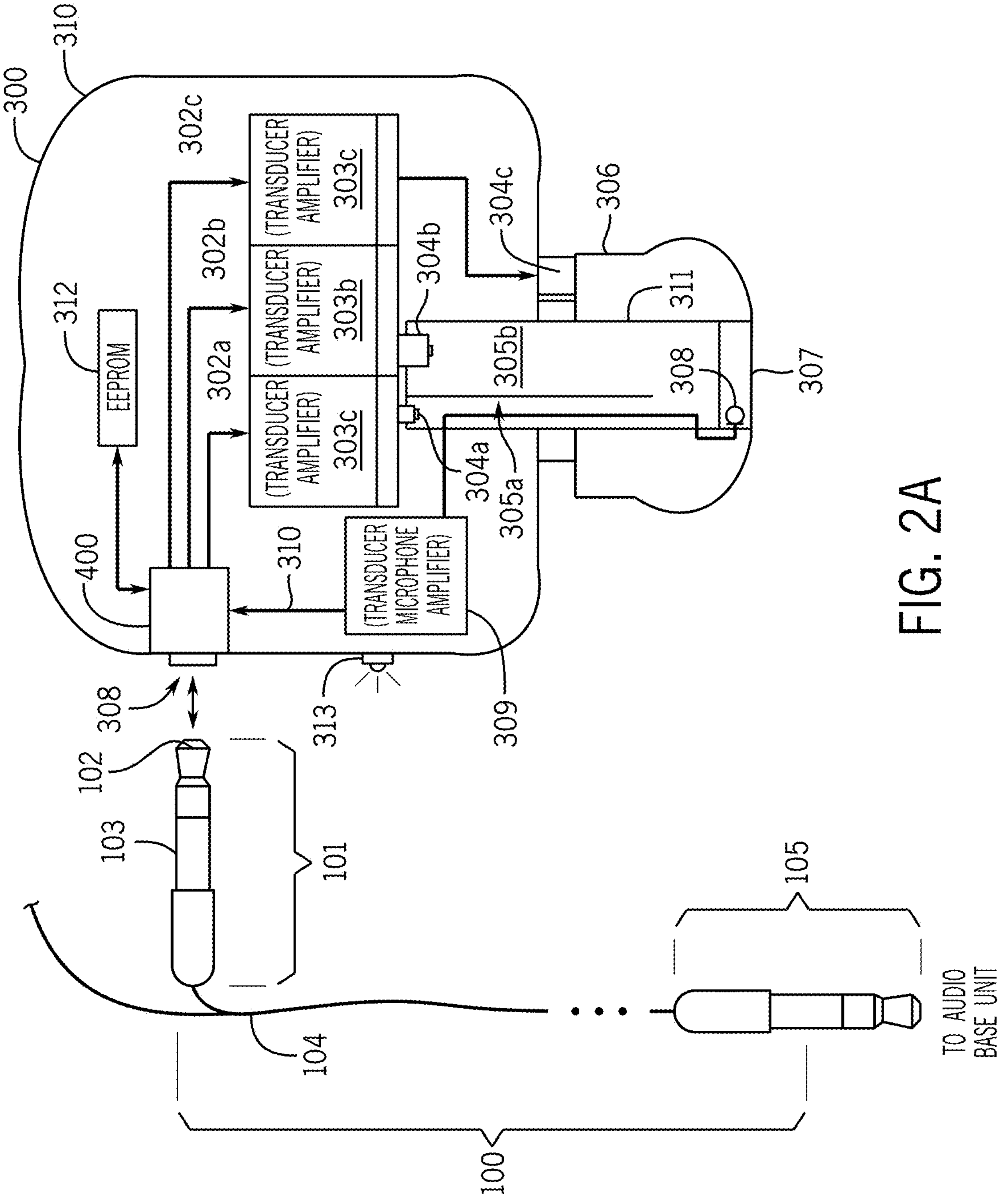
FIG. 2A depicts certain components in the exemplary embodiment, namely a multi-channel in-ear monitor and a bidirectional link.

FIG. 1 shows an in-ear audio monitoring system 1 using a bidirectional link 100 in accordance with an exemplary embodiment of the invention. The in-ear audio monitoring system 1 is designed to be used by musicians when practicing or performing. There are three basic elements to the in-ear audio monitoring system 1. A control console 10 with an RF transceiver operated by a sound engineer. The control console 10 can be a rack-mounted mixer or mixer recorder with a display and screens or can be connected to a digital audio workstation as is known in the art. A belt-worn, receiver body pack 200 with an RF transceiver 210 that communicates via tuned UHF or VHF with the control console 10. Two in-ear monitors 300A and 300B, e.g. right side and left side in-ear monitors. The bidirectional link 100 physically connects to the right side and the left side in-ear monitors 300A, 300B to the receiver body pack 200. A jack 105 physically connects one end of the bidirectional link 100 to a port 208 on the receiver body pack 200. Jacks 101A, 101B physically connect the other end of the bidirectional link 100 to ports 308A, 308B on the in-ear monitors 300A, 300B respectively. Although not shown and a non-preferred alternative, the receiver body pack 200 can be configured to have a second audio output port, similar to port 208, in which case one bidirectional link can be physically connected between the receiver body pack 200 and one of the in-ear monitors 300A and another bidirectional link 100B can be physically connected between the receiver body pack 200 and the other in-ear monitor 300B. Multi-channel digital audio data and non-audio data are transmitted over the bidirectional link 100 using time division multiplexed serial data transmission as described in more detail below with respect to FIG. 3. On stage, a multi-channel audio mix is typically transmitted at a selected radio frequency from the rack mounted RF transmitter on the control console 10 to the RF receiver 210 on the receiver body pack 200. Then, the multi-channel audio is converted to a serial digital data stream, along with other control data, which is transmitted over the respective bidirectional link 100 to the in-ear monitors 300A, 300B. Data is also transmitted from the in-ear monitors 300A, 300B to the receiver body pack 200 over the bidirectional link 100, as described in more detail below. For example, as depicted in FIG. 2A, each in-ear monitor 300A, 300B includes a microphone 308 to monitor sound and/or sound energy level exposed to the user's ear canal. The microphone signal is converted to digital serial data in the in-ear monitor 300A, 300B, and is transmitted over the bidirectional link 100 via time division multiplexing as described in more detail below. Typically, the in-ear monitoring system 1 will include several receiver body packs 200 and in-ear monitor 300A, 300B pairs, and the control console 10 will transmit the audio mix and otherwise communicate via the several receiver body packs 200. If desired, communication of data or instructions from a given pair of in-ear monitors 300A, 300B and receiver body pack 200 to another receiver body pack and pair of in-ear monitors can occur through RF transmission with the control console 10.

Figure 2B:
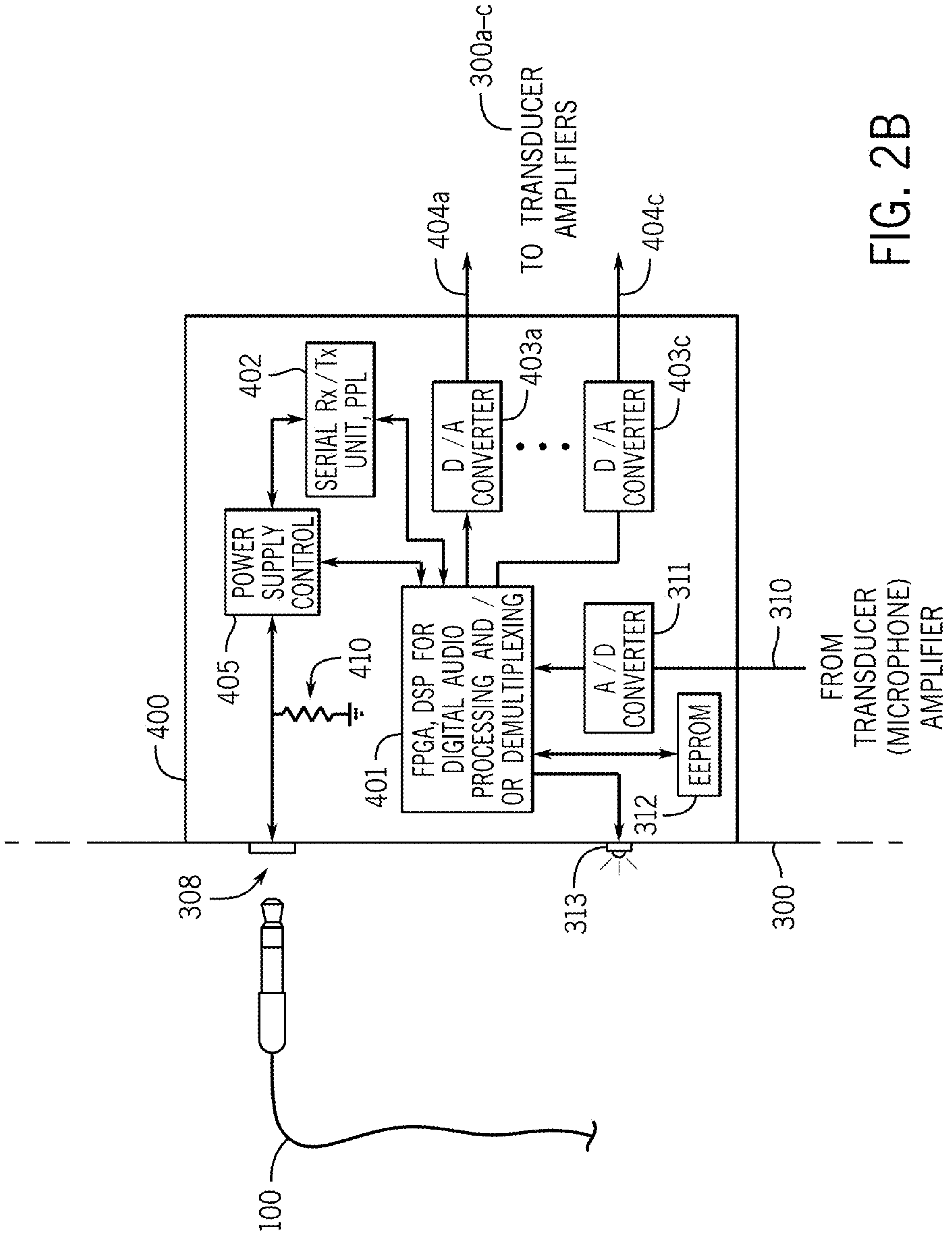
FIG. 2B illustrates components in a transducer processing unit 400 within the in-ear monitor of FIG. 2A.
Figure 2C:
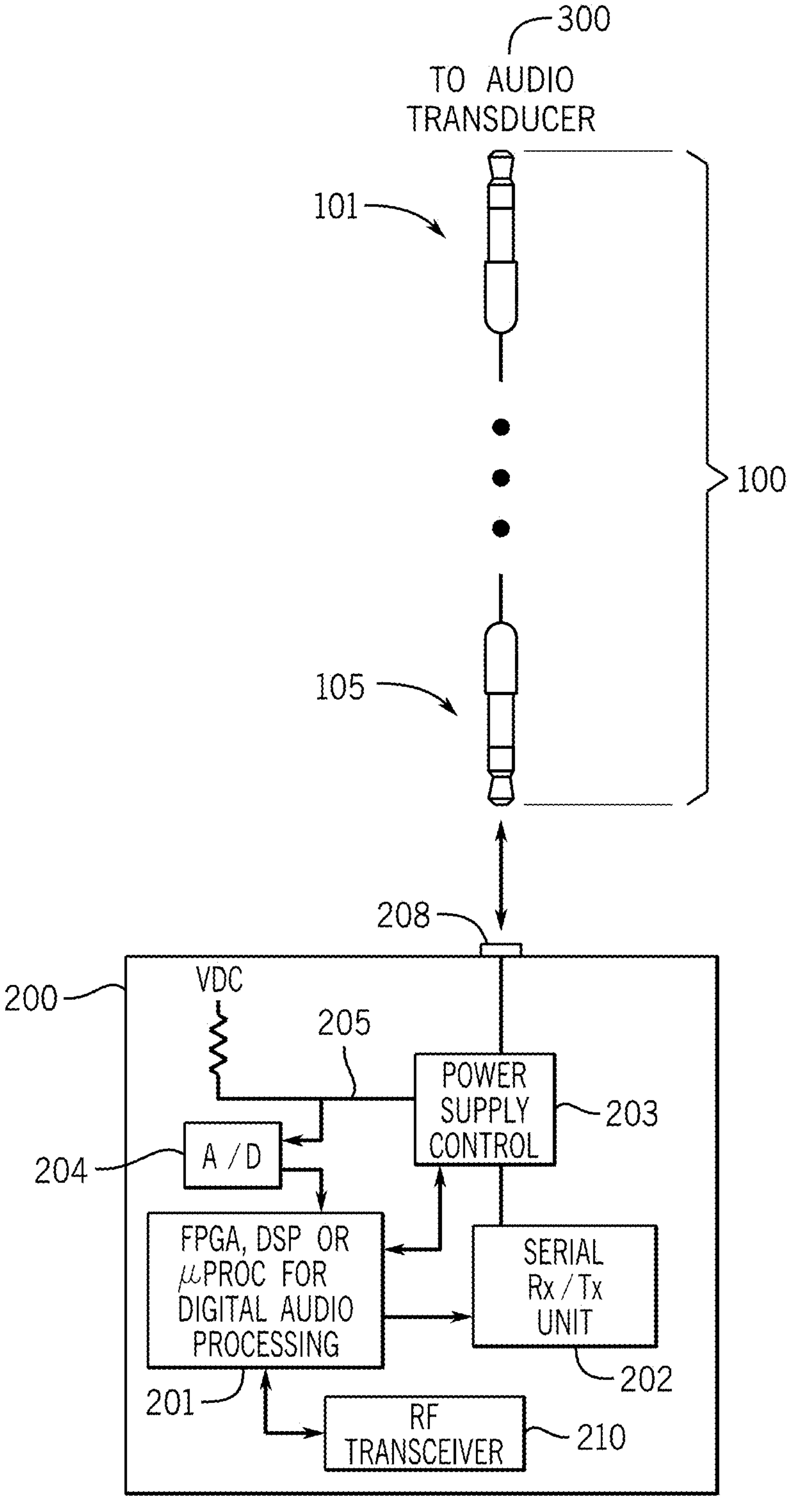
FIG. 2C illustrates an audio base unit and a bidirectional link constructed in accordance with the exemplary embodiment of the invention.

FIG. 2A illustrates an audio transducer system 300 configured to linked to an audio base unit 200, FIG. 2C, via a bidirectional link 100. FIG. 2C illustrates the audio base unit 200 connected via the bidirectional link 100. Exemplary audio base units 200 include an RF receiver body pack worn by performers as discussed above, but it is contemplated that the bidirectional link 100 can be used in other applications as well, such as where the audio base unit is mixing console, mixer recorder, computer, digital audio workstation, gaming station, television, telephonic equipment, etc.

Referring to FIG. 2A, the exemplary audio transducer system 300 depicted is one of two in-ear monitors. The in-ear monitor 300 depicted has an exterior housing 310 and in-ear channel 311 leading to an audio output port 307. A soft flexible plug 306 is coupled to the in-ear channel 311, and can also be attached to the exterior housing 310. The exterior housing 310 contains select electronic components (such as transducer/microphone amplifiers 303*a-c*, non-volatile memory (EEPROM) 312), and acoustic output elements, namely speakers 304*a-b*. A haptic output element 304*c* is optionally mounted to the exterior housing 310 adjacent to the in-ear flexible plug 306. An LED 313, FIG. 2B, indicating status of the in-ear monitor 300 is mounted to provide a signal outside of the exterior housing 310. The in-ear flexible plug 306 and a microphone element 308, are configured to be located in the ear canal of the user. As an alternative to a universal fit in-ear monitors using soft plugs, the invention can be implemented with custom molded earpieces, or with other types of ear buds as well.

The in-ear monitor 300 depicted in FIG. 2A is configured to reproduce high fidelity sound using the output of the two speakers 304*a-b* and the haptic output element 304*c*. The larger acoustic element 304*b* is more efficient at creating lower frequency physical sound waves and the smaller acoustic element 304*a* is more efficient at producing higher frequency physical sound waves. The haptic actuator 304*c*, coupled to the exterior housing 310 adjacent the in-ear plug 306, provides a vibrational or haptic "feel" to the user that may correspond to certain bass or other musical elements from a sound source. Since the in-ear monitor 300 otherwise blocks ambient noise to a large extent, the haptic actuator 304*c* helps the performer feel that they are in a more realistic environment, even the sound levels are much lower than the ambient noise level.

The audio transducer system 300 desirably includes one or more microphone elements 308, as mentioned above, placed to detect sound levels representing the sound resulting in the ear canal from audio feedback presented to the performer while using this device. In some embodiments, it may be desirable to monitor ambient sound levels being experienced by the user. This feature may be especially important if the in-ear monitor includes an opening to allow some ambient sound to enter. The sound levels may be calculated by an FPGA 401 (FIG. 2B) within the transducer processing unit 400. It is preferred that the transducer processing unit be in electrical communication with a non-volatile memory (such as EEPROM 312) that may be used to store data relating to the in-ear monitors, such as calibration data derived as a part of the manufacturing process, or personalized user settings. The non-volatile memory 312 is intended to retain data even through periods of time when the device is powered down. In some embodiments, it may be become desirable to remotely adjust sound levels so that the user can perceive a clear representation of the audio signal presented by the acoustic elements 304*a-b* to their ear canal, while avoiding levels so loud as to produce risk of hearing damage to the user. In some circumstances, a sound engineer may wish to be able to receive (hear) verbal commands provided by the user while performing. In these circumstances, the microphone element 308 may be built into the in-ear output port 307 in a way to enhance detection of a user's voice using sound travelling internally upward along their Eustachian tube(s) into their (plugged) ear canal, advantageously isolated from the external (noisy) environment. As shown in FIGS. 2A and 2B, the output signal 310 from the microphone 308 and the amplifier 309 is provided as input to an analog-to-digital (A/D) converter 311 whose digitized output is provided to the FPGA 401 (or alternative digital processor) in the transducer processing unit 400. The transducer processing unit 400 can prepare the data for transmission, or for analysis in the transducer processing unit 400, depending on preferences and settings. In some embodiments, it is desired to locate a microphone on the exterior housing 310 (not shown) to allow it to monitor sound levels that are ambient to the user while performing. The in-ear flexible plug 306 may be constructed of a flexible silicon compound or soft memory foam in others.

Sound waves produced by the output acoustic elements 304*a-b* are mixed through the output port 307 that fits (or protrudes) into the ear canal of a user. Even though this embodiment shows the use of three output acoustic elements 304*a-c* (including the two speakers 304*a-b* and the haptic element 304*c*), in other embodiments, a different number of output acoustic elements may be preferred. Unlike the prior art, a "frequency divider" circuit is not required, since the bidirectional cable 100 serially transmits multiple distinct audio data channels utilizing time-division-multiplexing, as discussed below FIG. 2B is a diagram of the components in the audio processing unit 400 within the audio transducer 300. Serial audio data is received through the bidirectional link 100 and transmitted to a serial transceiver 402. The audio processing unit 400 may receive DC power that is superimposed over communications being send through the bidirectional link that is isolated by a power supply isolation circuit 405. In this circuit capacitive coupling allows for serial communications signals generated (or received) by the serial transceiver 402 to be superimposed onto the DC voltage level. The serial transceiver 402 converts the serial audio data, for example, to PCM data streams that are de-multiplexed by the internal FPGA 401. While it is preferred to use an FPGA, a digital signal processor, microprocessor or microcontroller can be substituted for the FPGA 401. The FPGA 401 outputs distinct PCM data streams that are transmitted to a set of digital-to-analog (D/A) converters 403*a* and 403*c*. While the exemplary embodiment describes the use of PCM data streams, it is contemplated that the invention could be implemented with audio data streams encoded in formats other than PCM. Subsequently, the analog output 404*a* and

404*c* from the D/A converters 403*a-c* is applied as input to a set of analog amplifiers 302*a* through 302*c*, FIG. 2A, respectively for driving the speakers 304*a* and 304*b* and the haptic element 304*c*, respectively. The acoustic elements (speakers) 304*a* and 304*b* produce a physical waveform in chambers 305*a* and 305*b* that propagate through the output port 307 into the ear canal of the user to be heard by the user.

The analog signal 310 from the output of the microphone transducer amplifier 309, FIG. 2A, is applied to an analog-to-digital converter 311 to produce a data stream that is processed by FPGA 401. This data stream is returned to the audio base unit 200 via the serial transceiver 402 utilizing time-division-multiplexing to facilitate bidirectional serial communication over the bidirectional link 100. For some embodiments, the word clock may run at a 48 MHz rate. This disclosure also envisions the use of higher word clock rates such as 96 MHz.

The illustrated bidirectional link 100 is a cable with 3.5 mm jacks, however a wide array of connectors may prove suitable and are envisioned by this disclosure. Referring to FIG. 2A, in the preferred embodiment, the cable portion 104 of the bidirectional link 100 contains at least two conductors: 1) a signal line (i.e the active line connected to tip connector 102 on the jacks 101, 105) carrying bidirectional serial data superimposed on a DC power supply and 2) a ground line connected to the ring connectors 103 on the jacks 101, 105. The ground line 103 can also serve as the cable shielding. Although the use of 3.5 mm headphone jacks is illustrated, a segment of 50 ohm coaxial cable may be serve as the cable portion 104 of the bidirectional link 100, where simple BNC connectors placed at each end may serve as a means to connect the end-point connectors 101 and 105 with the ports 308 and 208 (in this case configured to receive a BNC connector) on the audio transducer 300 and base unit 200 respectively.

Desirably, once the bidirectional link 100 is connected between the audio base unit 200 and the transducer processing unit 400, a limited (test) from DC power supply 205, FIG. 2C, is superimposed on the active line. An ID resistor 410 in the transducer processing unit 400 creates an identifiable voltage drop in line 205 in the audio base unit 200 that is measured by an analog-to-digital converter (ADC) 204 housed in the audio base unit 200. The value of the detected ID resistor is determined and referenced to a library of values to confirm the interoperability of serial communications over the active line 102 of the bidirectional link 100. Once this has been established, the audio transducer processor unit 400 may retrieve a factory programmed ID (along with other settings) from internal non-volatile memory and communicate these to the Rx/Tx transceiver unit 202 in the audio base unit 200 to be interpreted by a processing unit 201 on the audio base unit, see FIG. 2C. The audio transducer system 300 may additionally serially transmit other information to the audio base unit 200, including information regarding the type of audio transducer system 300, its power/bias voltage requirements and desired serial protocol for the exchange of audio information such as the number of channels and type of audio (e.g. sample rate, 16, 24 or 32 bit sample size) and/or user settings, etc. In some embodiments, the audio base unit 200 may contain a library of settings to allow it to configure a wide array of audio transducers systems 300 (or other compatible equipment) after they are connected. In cases when the audio base unit 200 identifies a compatible (and configurable) audio transducer system 300, the audio base unit 200 may send a compatibility success message to the audio transducer system 300, causing it to light an externally visible LED 313 to alert the user that the devices (200 and 300) are indeed interoperable via the hardware providing the bidirectional link 100. In these cases, the audio base unit 200 provides a DC supply voltage and bias voltage (used by the microphone 308) via an internal array of analog switches 203 controlled by the processing unit (FPGA) 201. In a preferred embodiment, a current limit of 100 mA may be imposed on the DC supply to protect components in the audio base unit 200 and in the audio transducer system 300. Preferably, serial communications between the units 200 and 300 proceeds at 48 MHz in a format that is similar to the Multichannel Audio Digital Interface (MADI), as described by the AES10 standard of the Audio Engineering Society. If serial data from the audio base unit 200 includes a known sequence that is periodically transmitted, a PLL located in the serial Tx/Rx unit 402 of the transducer processing unit 400 of the audio transducer system (e.g., in-ear monitor) 300 may synchronize itself to derive a word clock signal synchronized to the audio base unit 200. In the preferred embodiment, a green LED 313 (FIG. 2B) visible from an external portion of the audio transducer system 300 enclosure may be illuminated to indicate interoperability, while a red (or flashing red) LED may indicate the failure of the devices (200 and 300) to establish or sustain bidirectional serial communications. When compatibility is not indicated, the DC power supply can be made inactive to prevent any damage if connected to an unknown audio transducer system 300. At this point, the absence of a green LED 313 (or presence of a flashing red LED) may notify the user that no (potentially damaging) DC voltage or bias voltage has been activated.

The simplicity and flexibility of the cable portion 104 and associated connectors 101 and 105 are advantageous. Users be confident that the interconnection between the audio transducer system (e.g., in-ear monitors) 300 and the audio base unit (e.g., RF receiver body pack) 200 will function effectively. Those skilled in the art will understand that aspects of the invention can be implemented if the bidirectional cable 100 is connected permanently to the audio transducer 300, thereby avoiding the need for connector/jack 101. For example, the bidirectional cable can be connected permanently to the pair of in-ear monitors 300A, 300B. Or, a segment of bidirectional cable can be connected permanently between the pair of in-ear monitors 300A, 300B (FIG. 1) and a jack on the main segment of the bidirectional cable from the receiver body pack 200 can connect to a port on the segment between the in-ear monitors 300A, 300B.

Figure 3A:
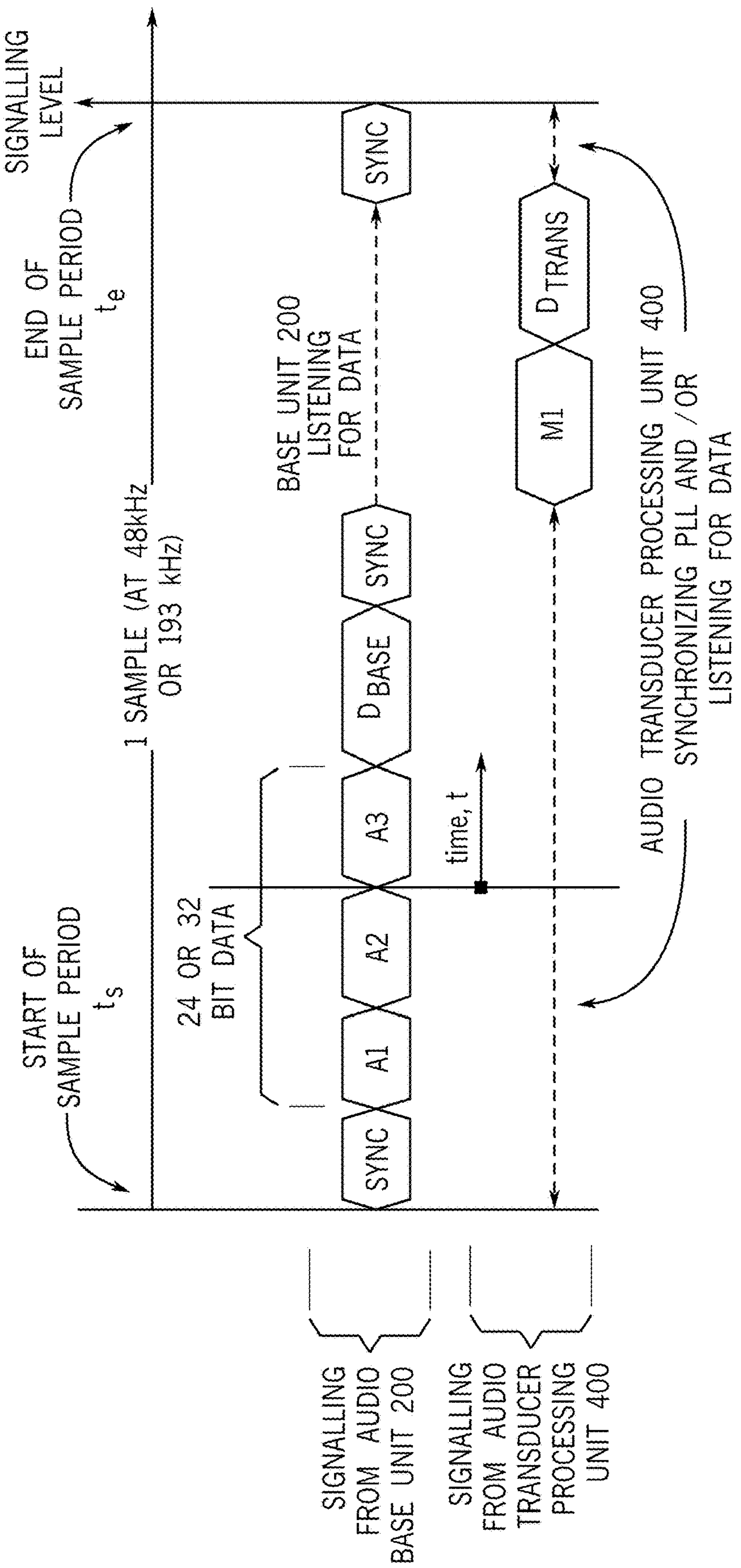
FIG. 3A illustrates an example timing diagrams to show how bidirectional serial communications may be achieved by applying time-division multiplexing (TDM) between two half duplex signaling components that are located on opposite ends of the bidirectional communications link. The time period shown corresponds to one sample period for the digital audio data.

The exemplary embodiment uses half-duplex, bidirectional serial communications over the active line in the bidirectional link 100. A half-duplex serial communications link at each (200 and 300) end of the bidirectional link 100 provides a simple means for bidirectional communication through a single conductor. In these cases, time-division multiplexing enables bi-directional communication across the link 100, by employing time-division-multiplexing between the serial transmitter 202 in the audio base unit 200 and serial transmitter 402 in the audio transducer system 300 (i.e., within the transducer processing unit 400). A timing diagram illustrating the concept is provided in FIG. 3A, which illustrates a timing diagram over the span of a single sample period that may correspond to the audio sample period. The audio sample rate is preferably set to either $F_s$=48 kHz or $F_s$=192 kHz, and in any event no less than 8 kHz. In general, an arbitrary audio sample rate (e.g., any value within a continuous supported range) may be selectable (programmable) by the user. The time spanned between the start of a sample period (as labelled $t_s$ on the upper left side of FIG. 3A) and the end of a sample period (as labelled $t_e$ on the upper right side of FIG. 3A is $$t_e - t_s = \frac{1}{F_s} \text{ (seconds).}$$

Figure 3B:
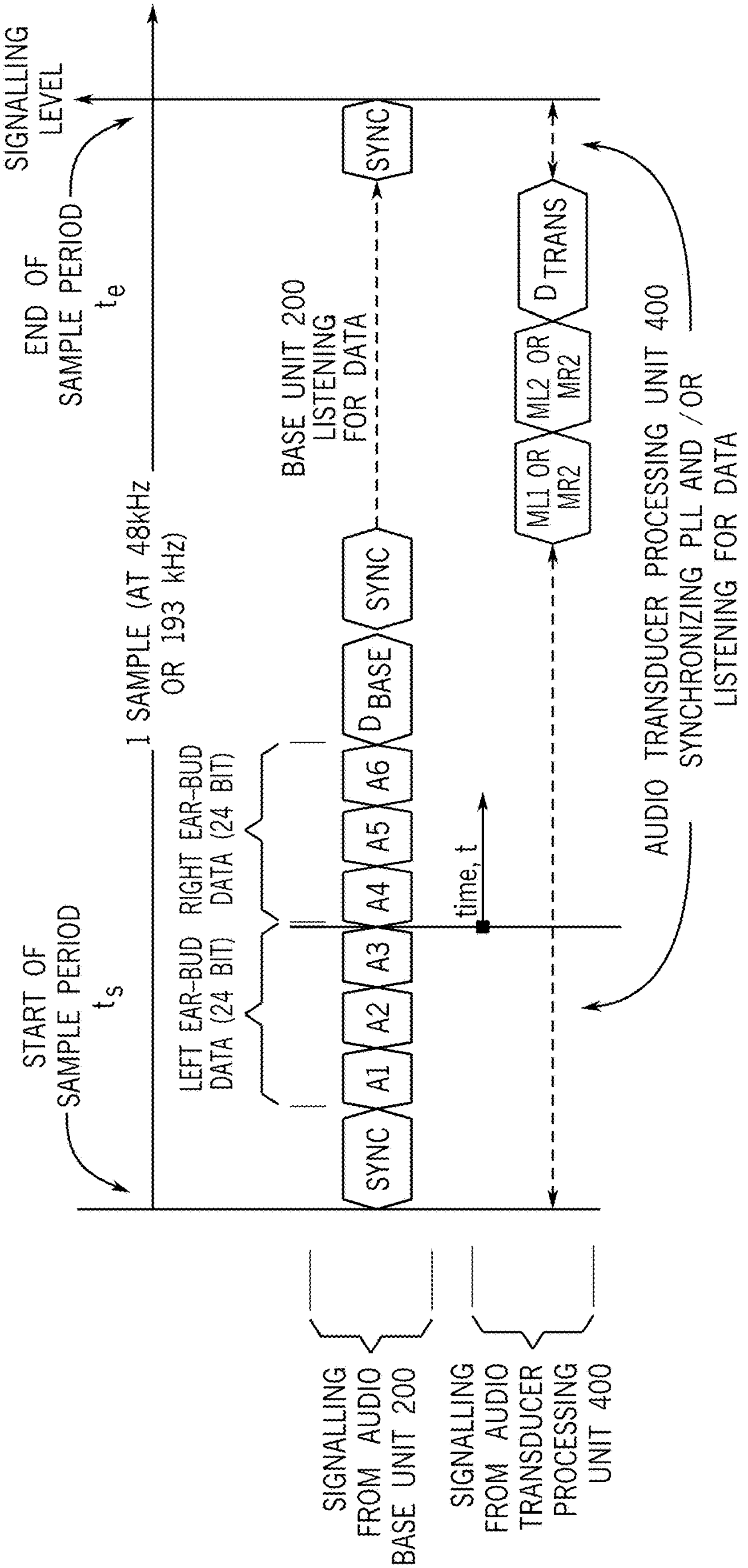
FIG. 3B is a timing diagram similar to FIG. 3A modified to describe serial communication using time-division multiplexing (TDM) over the active line in the bidirectional link in a system having a right in-ear monitor and a left in-ear monitor.

This protocol may be repeated over each sample period where the end-time $t_e$ for each end of a given sample period corresponds to the start-time $t_s$ for the next sample period. Signaling activity from the audio base unit 200 and from the transducer processing unit 400 are labelled on the left side as "Signaling from audio base unit 200" and "Signaling from audio transducer processing unit 400", respectively. The signaling over time is readily envisioned by considering the intersection between the vertical line, labelled "time, t" and the audio base unit 200 signaling waveform (top waveform in FIG. 3A) and the transducer processing unit 400 signaling waveform (lower waveform in FIG. 3A) as time, t progresses from left to right over the sample interval. Initially, at the start of a sampling interval (where $t=t_s$), the audio base unit 200 may emit a predetermined synchronizing word that facilitates a lock for a PLL in the serial transceiver 402 operating in the transducer processing unit 400 of the audio transducer system 300 to generate a word clock reference. The transducer processing unit 400 may then prepare to receive audio data from the base unit 200, starting with the first channel, where a 24- or 32-bit data word is denoted by the label "A1" in FIG. 3A. For some embodiments, the use of a different number of bits or a different format (e.g., floating point) may be preferable. The audio base unit 200 may then continue to sequentially transmit the audio sample corresponding to each remaining channel "A1" through "A3", wherein general, an arbitrary number of channels may be sequentially sent. For the example shown in FIG. 3A, three channels A1, A2 and A3 are assumed. The audio data A1 and A2 drives the small speaker 304*a* and the large speaker 304*b*, and the data A3 drives the haptic element 304*c*. Once the transmission of the final audio sample is complete, the audio base unit may then continue by transmitting device data (as labeled by the packet Dbase in FIG. 3A). This data may include command settings, environment status, metadata, acknowledgement of the receipt of data sent earlier from the transducer processing unit 400 or any other information that it may be desirable for the audio base unit 200 to be able to communicate to the audio transducer system 300. Following this, the base unit 200 may transmit another synchronizing word that may notify the transducer processing unit 400 that it may begin transmitting its audio data (or in some embodiments this may be sound level data) in the desired format, as denoted by "M1" in FIG. 3. Again, an arbitrary number of channels of data may be sequentially sent by the transducer processing unit 400 (e.g. M1, M2 . . . , etc.). For embodiments where two in-ear monitors 300A, 300B are attached to the bidirectional link 100 as shown in FIG. 1, the data packet Dbase also desirably contains address data to notify the in-ear monitors 300A, 300B that the receiver body pack 200 is ready to receive monitored sound related data, denoted by ML or MR in FIG. 3B if derived from the left or right in-ear monitors, respectively. Again, an arbitrary number of channels of data may be sequentially sent. For example, if two in-ear monitors 300A, 300B are used as shown in FIG. 1, it may be preferred that the audio base unit 200 toggle requests for audio data between the left and right in-ear monitors from one sample period to the next. In this case, each transducer processing unit 400 (of the left or right in-ear monitor 300A, 300B) sends two data words to represent the two samples, (ML1 and ML2 or MR1 and MR2, respectively) since each will only receive a request for data every other sample period. As shown in FIG. 3B, it may be more convenient to use a protocol where the audio base unit 200 transmits data for all three transducers in both the left and right earbuds during every sample period. In the example in FIG. 3B, data words A1-A3 correspond to transducers 304*a-c* in the left in-ear monitor, while data words A4-A6 correspond to the transducers 304*a-c* of the right in-ear monitor. After, the completion for transmission of data from the transducer processing unit 400 (pertaining to the given sample period) to the transceiver 202 within the audio base unit 200, the transducer processing unit 400 may continue by sending a data word (labelled $D_{trans}$ in FIGS. 3A and 3B) that includes information related to signal analysis or acknowledgment of changes to device settings for operation of the audio transducer system 300. Finally, at the conclusion of this, the base unit 200 may continue by transmitting a final synchronizing signal until the end of the sample period (where $t=t_e$) before the system continues with commencing similar operations over the next sample period.

This disclosure describes various exemplary embodiments of the invention, however, alternative designs and applications should be considered within the scope of the invention.

The invention claimed is:

1. A multi-channel audio system comprising:

an audio base unit having an RF receiver capable of communicating wirelessly in the VHF or UHF frequency ranges and further configured to output base device data and multi-channel digital audio data, wherein the base device data comprises at least control data;

an audio transducer system comprising an audio transducer processing unit, a receive and transmit unit with a phase-locked loop, a plurality of transducer amplifiers and a plurality of acoustic output elements, said audio transducer processing unit also configured to output transducer device data, wherein the transducer device data comprises at least control or status data;

a bidirectional connecting cable with an active line, a ground line and a connector for removably connecting the cable to a port on the audio base unit;

wherein the base device data and the multi-channel digital audio data are transmitted over the active line in the bidirectional connecting cable to the audio transducer system and the transducer device data from the audio transducer processing unit is also transmitted over the active line to the audio base unit, and transmitted data is digital data and is transmitted bidirectionally over the active line as time-division multiplexed serial data words; and wherein the bidirectional time-division multiplexed serial data words are transmitted over the active line during a synchronized sample period having a constant frequency with a start of each sample period ts and an end of each sample period te, and further wherein the base unit emits a predetermined start synchronizing word at the start of each sample period ts on the active line of the bidirectional connecting cable that facilitates locking of the phase-locked loop in the the audio transducer system to generate a word clock reference and then emits data words of the multi-channel digital audio data, and the base device data is followed by a transition synchronizing word to notify the transducer processing unit to begin transmitting the transducer device data from the audio transducer processing unit over the active line to the audio base unit.

2. The multi-channel audio system as recited in claim 1 wherein the audio transducer processing unit comprises:

an internal digital processor that demultiplexes the multi-channel digital audio data transmitted from the audio base unit and outputs separate digital audio signals for each respective acoustic element; and multiple digital-to-analog converters, each receiving one of the separate digital audio signals and outputting an analog audio signal for each respective acoustic element.

3. The multi-channel audio system as recited in claim 2 wherein the receive and transmit unit with the phase-locked loop are implemented by the audio transducer processing unit.

4. The multi-channel audio system as recited in claim 1 wherein the audio transducer system further comprises an input transducer, a transducer amplifier for the input transducer, an analog-to-digital converter in the transducer processing unit that outputs digital sensor data, wherein the digital transducer data also comprises digital sensor data.

5. The multi-channel audio system as recited in claim 4 wherein said input transducer in each in-ear monitor is a microphone element situated to detect sound level in or near the user's ear.

6. The multi-channel audio system as recited in claim 4 wherein said input transducer in each in-ear monitor is a microphone element situated to detect the user's voice in the user's ear canal.

7. The multi-channel audio system as recited in claim 1 wherein the audio base unit has a power supply control that outputs DC power on the active line of the bidirectional connecting cable, and the audio transducer system detects data superimposed on the DC power, and the DC power is used to operate the components on the audio transducer system, a first acoustic chamber extending from the first speaker in the exterior housing into the in-ear plug housing and a second acoustic chamber extending from the second speaker in the exterior housing into the in-ear plug housing.

8. The multi-channel audio system as recited in claim 7 wherein DC bias voltage for the input transducer on the audio transducer system is provided from a power supply control on the audio base unit.

9. The multi-channel audio system as recited in claim 1 wherein the audio transducer processing unit further comprises an ID resistor.

10. The multi-channel audio system as recited in claim 9 wherein the connecting cable comprises a second connector for removably connecting the bidirectional connecting cable to a port on the audio transducer element, and DC power is transmitted from the audio base unit only if it is determined that the ID resistor is compatible with audio base unit.

11. The multi-channel audio system as recited in claim 10 further comprising an LED light on the audio transducer element that illuminates to indicate compatibility.

12. The multi-channel audio system as recited in claim 1 further wherein the base unit transmits a final synchronizing signal at the end of the sample period (where $t=t_e$).

13. The multi-channel audio system as recited in claim 1 wherein the audio transducer system comprises a left side in-ear monitor and a right side in-ear monitor, and each in-ear monitor includes:

an exterior housing, and said plurality of acoustic output elements in each in-ear monitor include a first speaker and a second speaker;

an in-ear plug housing that is configured to be placed in the ear canal of the user, said in-ear plug housing having an acoustic output port; and a first acoustic chamber extending from the first peaker in th e exterior housing into the in-ear plug housing and a second acoustic chamber extending from the second speaker in the exterior housing into the in-ear plug housing.

14. The multi-channel audio system as recited in claim 13 wherein the transition synchronizing word is transmitted to notify one or both of the in-ear monitors to begin transmitting the transducer device data from the respective in-ear monitor over the active line to the audio base unit.

15. An audio system comprising:

an audio base unit having an RF receiver capable of communicating wirelessly in the VHF or UHF frequency ranges and further configured to output DC power, base device data, and digital audio data, wherein the base device data comprises at least control data;

an audio transducer element comprising an audio transducer processing unit, a receive and transmit unit with a phase-locked loop, at least one transducer amplifier and at least one acoustic element, said audio transducer processing unit configured to output transducer device data, wherein the transducer device data comprises at least control or status data;

a bidirectional connecting cable with an active line, a grounded line and a connector for removably connecting the cable to a port on the audio base unit; wherein the DC power output from the audio base unit, the base device data and the digital audio data are transmitted over the active line in the connecting cable and the transducer device data from the audio transducer processing unit is also transmitted over the active line, and transmitted data is digital data and is transmitted bidirectionally over the active line as time-division multiplexed serial data words and wherein the bidirectional time-division multiplexed serial data words are transmitted over the active line during a synchronized sample period having a constant frequency with a start of each sample period ts and an end of each sample period te, and further wherein the base unit emits a predetermined start synchronizing word at the start of each sample period ts on the active line of the bidirectional connecting cable that facilitates locking of the phase-locked loop in the audio transducer system to generate a word clock reference and then emits data words of the digital audio data, and the base device data is followed by a transition synchronizing word to notify the transducer processing unit to begin transmitting the transducer device data from the audio transducer processing unit over the active line to the audio base unit.

16. The audio system as recited in claim 15 wherein the audio transducer system further comprises an input transducer, a transducer amplifier for the input transducer, an analog-to-digital converter in the transducer processing unit that outputs digital sensor data, the digital transducer data also comprises the sensor data.

17. The audio system as recited in claim 15 wherein the audio transducer system comprises a left side in-ear monitor and a right side in-ear monitor, and each in-ear monitor includes:

an exterior housing containing the at least one acoustic output element which comprises a speaker;

an in-ear plug housing that is configured to be placed in the ear canal of the user, said in-ear plug housing having an acoustic output port.

18. The audio system as recited in claim 17 wherein the audio transducer processing unit for the left or right in-ear monitor or for both further comprises an ID resistor, wherein the connecting cable comprises a second connector for removably connecting the bidirectional connecting cable to a port for the left or right in-ear monitors or for both, and DC power is transmitted from the audio base unit only if it is determined that the ID resistor is compatible with audio base unit, an LED light illuminates to indicate compatibility.

19. The audio system as recited in claim 17 wherein the transition synchronizing word is transmitted to notify one or both of the in-ear monitors to begin transmitting the transducer device data over the active line to the audio base unit.

* * * * *